F. PAULSEN.
PNEUMATIC TIRE CORE.
APPLICATION FILED NOV. 15, 1920.

1,379,834. Patented May 31, 1921.

Witness:
R. C. Hamilton

Inventor
F. Paulsen
By Thorpe & Gerard
Attorneys

UNITED STATES PATENT OFFICE.

FREDERICK PAULSEN, OF KANSAS CITY, MISSOURI.

PNEUMATIC-TIRE CORE.

1,379,834.　　　　Specification of Letters Patent.　Patented May 31, 1921.

Application filed November 15, 1920. Serial No. 424,105.

*To all whom it may concern:*

Be it known that I, FREDERICK PAULSEN, citizen of the United States, and resident of Kansas City, county of Jackson, State of Missouri, have invented a certain new and useful Improvement in Pneumatic-Tire Cores, of which the following is a complete specification.

This invention relates to pneumatic tire cores, of that class in which the carcass is subjected to a stretching action crosswise preliminary to and during the curing operation in the heater press, and has for its object to produce a rigid metal hollow tire core having elements for stretching the carcass across the tread portion thereof when the mold is clamped upon the carcass, and also of such a character that by the use of elements of different proportion the stretch may be applied also where the tread and sidewalls join or merge, if it is found necessary to remedy certain defects in the tire at the sides as noted from use.

With this object in view and others as will hereinafter be pointed out, the invention consists in certain novel and useful features of construction and organization of parts as hereinafter described and claimed; and in order that it may be fully understood, reference is to be had to the accompanying drawing, in which:—

Figure 1:
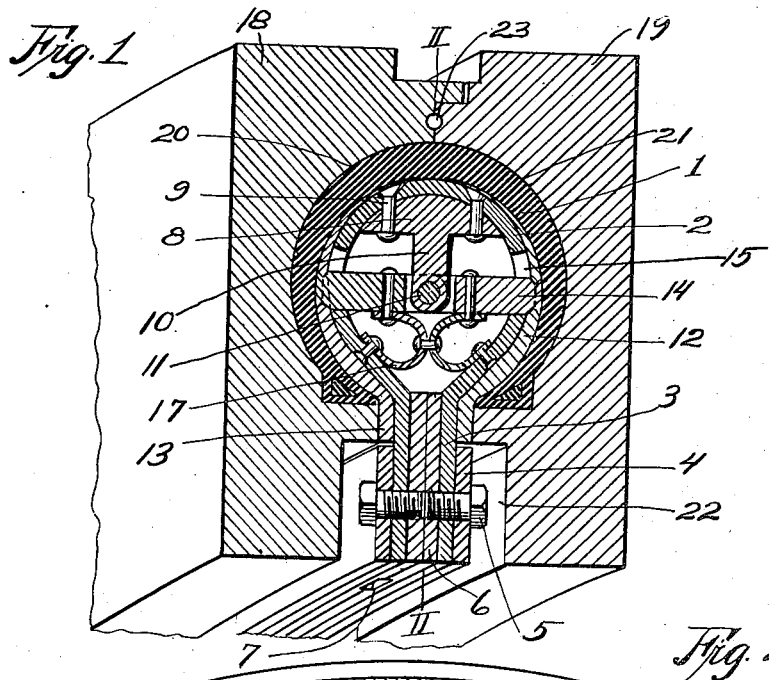
Figure 1, is a cross section of a tire core embodying the invention, the figure also showing the mold and the casing to be cured fitted between the former and the tire core.

In the said drawing, where like reference characters identify corresponding parts in all of the figures, 1 is a pneumatic tire casing of the common and well-known built-up character, comprising superimposed layers of fabric and rubber with its greatest thickness at the tread portion of the tire, and 2 a rigid core, which may be cast or formed in any suitable manner, of relatively horse-shoe shape in cross section and formed at its inner edges with inwardly projecting flanges 3, which are provided with external outwardly-facing shoulders 4 produced by rings secured to the outer faces of the flanges by means of bolts 5.

Secured to the inner faces of the flanges by means of the bolts 5 and abutting sidewise, are metal rings 6, provided with oppositely-disposed grooves 7 adapted to form a channel communicating with the interior of the core after the two flanged ends of the latter have been bolted together, to provide a means of entry for the steam used during the curing operation in order to heat the interior of the core.

Arranged within the core at the tread portion thereof, is an arcuate series of metal reinforcing plates 8, secured to the core by rivets 9 or in any other suitable manner, and each plate 8 is formed with a pair of inwardly projecting lugs 10, provided with central perforations for the reception of pivot pins 11.

Fitting firmly against the outside surface of the tire core 2, is a pair of slidable steel sleeve cores 12, tapered at their outer ends for a purpose hereinafter mentioned, and being formed at their inner ends with flanges 13 adapted to be abutted by the mold as the same is closed, as shown clearly in Fig. 1.

At approximately the axis point of the bore or chamber of the core, the sleeve cores 12 have pivot arms 14, which project through radial slots 15 provided therefor in the walls of the core 2. The pivot arms 14 are formed with perforated bifurcated portions 16 at their inner ends, and are adapted for pivotal action around the pivot pins 11.

Figure 2:
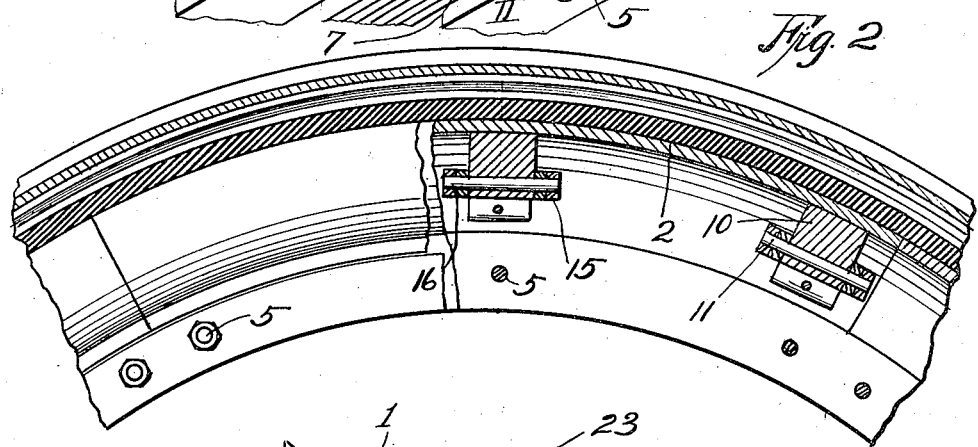
Fig. 2, is a central circumferential section on the line II—II of Fig. 1, part of the figure being shown in elevation.

Secured to the pivot arms at a point just outward of the pivotal point thereof, are a pair of relatively horse-shoe shaped expansion springs 17, the opposite ends of the springs being immovably secured to the interior walls of the core 2 at a point below the horizontal axis thereof as illustrated. The action of these springs is such as to open the sleeve cores as shown in Fig. 2, by moving the pivot arms 14 outward in slots 15 when the pressure of the mold is released.

After the tire has been built and cemented to the core by the use of a suitable rubber cement, and preliminary to the curing operation thereof, the tire and core are fitted in a mold of any suitable construction and formed, in this instance, of two members 18 and 19, respectively grooved at 20 and 21 to accommodate the type of tire casing to be cured. The molds are also recessed in their inner edges as at 22 to accommodate the rings 3, forming the external shoulders of the flanges of the core. At a point between the tongue and groove relation of the two members of the mold and its interior face, each member is grooved as at 23 to form a circumferential recess for the reception of any excess rubber during the curing operation.

The tongue and groove relation of the two members of the mold is provided so that said members when being clamped together shall move undeviatingly and apply pressure on the flanges 13 of the sleeve cores to cause the latter to slide radially inward so that the casing may be properly and efficiently stretched prior to the curing thereof.

Figure 3:
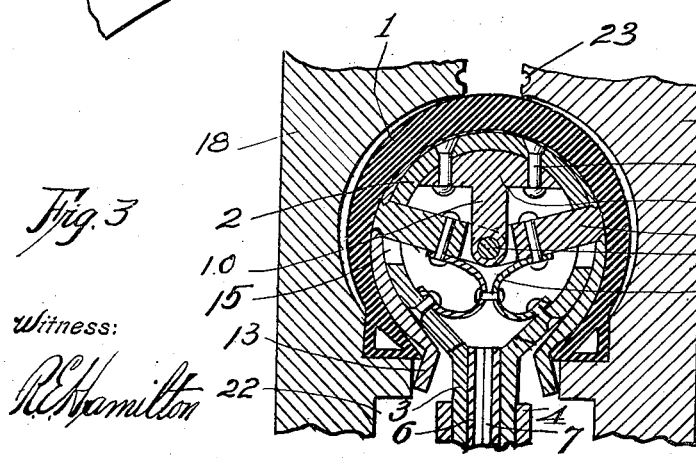
Fig. 3, is a section similar to that of Fig. 1, but with the mold in open position and illustrating the slidable side sleeve core in open position.

It will be noted also, by reference to Fig. 3, that the space between the mold and the tire casing is such, that during the clamping operation, there is no possibility of air being trapped therein as it will be forced toward the tread portion and will escape through the joint formed by the abutment of the two members.

One of the features of the present invention is the fact that by means of the slidable core sleeves and the cementing of the tire thereto, a positive stretching action is given to the tire casing, and also that by changing the length of the tapered portions, the stretch of the casing may be concentrated to any desirable point thereof. By reference to Fig. 3 of the drawing, it will be noted that initially the two sleeve core members may abut each other at their attenuated ends in the vertical axis of the tire, but that (see Fig. 1), after the closing of the mold, the tapered ends have moved apart, thus restricting the greater part of the stretching action to the tread portion. It will be understood that by shortening the tapered ends the stretching action may be increased to also include the side walls of the casing, if found desirable, or the tire may be stretched on one side only.

From the above description it will be apparent that I have produced a device of the character described which possesses all the features of advantage pointed out, and while I have described and illustrated the preferred embodiment of the same, I reserve the right to all changes properly falling within the spirit and scope of the appended claims.

I claim:

1. A circular tire core comprising a body of rounded form in cross section and segmental plates of tapering form, fitting against the outer surface of said body and slidable radially thereof.

2. A circular tire core comprising a body of rounded form in cross section and segmental plates of tapering form, fitting against the outer surface of said body and slidable radially thereof, and yielding means for opposing such slidable movement.

3. A circular tire core comprising a body of rounded form in cross section, and segmental plates of tapering form fitting against the outer surface of said body, and means for imparting sliding movement to said plates radially of the said body.

4. A circular tire core comprising a body of rounded form in cross section, segmental plates of tapering form fitting against the outer surface of said body and slidable radially thereof, and means pivotally connecting said plates axially of the cross-sectional curvature of said body.

5. A circular tire core comprising a body of rounded form in cross section, segmental plates of tapering form fitting against the outer surface of said body and slidable radially thereof, means pivotally connecting said plates axially of the cross-sectional curvature of said body, and yielding means applying pressure on said pivotally-connected means, tending to effect approaching movement of said plates, at their attenuated edges.

6. A circular tire core, comprising a body of rounded form in cross-section, and segmental plates of tapering form, fitting against the outer surface of said body and provided at their inner edges with flanges.

7. A circular tire core, comprising a body of rounded form in cross section, segmental plates of tapering form, fitting against the outer surface of said body and provided at their inner edges with flanges, and yielding means tending to impart outward radial movement to said plates to effect approaching movement of the attenuated edges and separating movement of the said flanges.

8. A circular tire core comprising a body of rounded form in cross-section, provided with side openings, segmental tapering plates fitting against opposite sides of the body, provided with lugs projecting into the body through said openings and coincidentally pivoted at a fixed point within said body, and yielding means tending to cause the plates to approach at their attenuated edges.

9. A circular tire core comprising a body of rounded form in cross-section, provided with side openings, segmental tapering plates fitting against opposite sides of the body, provided with lugs projecting into the body through said openings and coincidentally pivoted at a fixed point within said body, said plates at their opposite edges having flanges, and yielding means tending to cause the plates to approach at their attenuated edges.

10. A hollow circular tire core comprising a body of rounded form in cross section and provided in its inner periphery with a passage, and segmental plates of tapering form, fitting against the outer surface of said body and slidable radially thereof.

11. A hollow circular tire core comprising a body of rounded form in cross section and provided at its inner periphery with abutting flanges provided with a radial passage, bolts securing said flanges tightly together, and segmental plates of tapering form, fitting against the outer surface of said body and slidable radially thereof.

12. A hollow circular tire core comprising a body of rounded form in cross-section, and segmental plates of tapering form fitting against the outer surface of the said body and slidable radially thereof and detachably secured to the side walls of a tire carcass inclosing the core, and separable means for applying pressure to cause the said plates to slide and stretch the carcass between their attenuated edges.

13. A hollow circular tire core comprising a body of rounded form in cross-section, and segmental plates of tapering form fitting against the outer surface of the said body and slidable radially thereof and detachably secured to the side walls of a tire carcass inclosing the core and provided at their inner ends with flanges, and means for applying pressure on said flanges to cause said plate to slide radially inward on said body and stretch the carcass between their outer ends.

14. A circular tire core comprising a body consisting of a plurality of sections of rounded form abutted together endwise, a circular series of segmental plates fitting against each side of said body and tapering outwardly thereof, opposite plates of said series having lugs projecting into the body and pivotally connected together and to fixed points of the body, and means for applying pressure on said plates from opposite sides to cause them to move radially inward on the body.

In testimony whereof, I hereunto affix my signature.

FREDERICK PAULSEN.